United States Patent [19]

Bauer et al.

[11] Patent Number: 4,969,619
[45] Date of Patent: Nov. 13, 1990

[54] ADJUSTABLE-LENGTH COLUMNS FOR CHAIRS, TABLES OR THE LIKE

[75] Inventors: Hans J. Bauer; Hans-Peter Bauer, both of Altdorf, Fed. Rep. of Germany

[73] Assignee: Suspa Compart Aktiengesellschaft, Altdorf, Fed. Rep. of Germany

[21] Appl. No.: 417,606

[22] Filed: Oct. 5, 1989

[30] Foreign Application Priority Data

Oct. 6, 1988 [DE] Fed. Rep. of Germany ....... 3833959

[51] Int. Cl.⁵ ............................................ F16M 11/00
[52] U.S. Cl. ..................................... 248/161; 297/345
[58] Field of Search ...................... 248/161, 407, 162.1, 248/404, 405, 159, 406, 406.1; 297/338, 339, 345, 347

[56] References Cited

U.S. PATENT DOCUMENTS

| 3,711,054 | 1/1973 | Bauer . |
| 3,790,119 | 2/1974 | Bauer ............................. 248/161 X |
| 3,837,704 | 9/1974 | Bauer ................................. 297/345 |
| 4,245,826 | 1/1981 | Wirges ........................... 297/345 X |
| 4,692,057 | 9/1987 | Lauderbach .................... 248/161 X |
| 4,720,068 | 1/1988 | Tornero ................................. 248/161 |
| 4,756,496 | 7/1988 | Hosan et al. .................... 297/345 X |

FOREIGN PATENT DOCUMENTS 0133524 4/1987 European Pat. Off. .
7434102 3/1975 Fed. Rep. of Germany .

Primary Examiner—Karen J. Chotkowski
Attorney, Agent, or Firm—Browdy and Neimark

[57] ABSTRACT

An adjustable-length column for chairs, tables or the like has an upright tube and a gas spring disposed in it. The piston rod of the gas spring is supported against a bottom plate of the upright tube. To assure support of the bottom plate in the face of extremely strong forces in the axial direction of the column at little manufacturing expense, the rim of the upright tube is bent inward approximately semicircularly in cross section. The bottom plate is supported on the end face of this rim.

7 Claims, 1 Drawing Sheet

U.S. Patent
Nov. 13, 1990
4,969,619
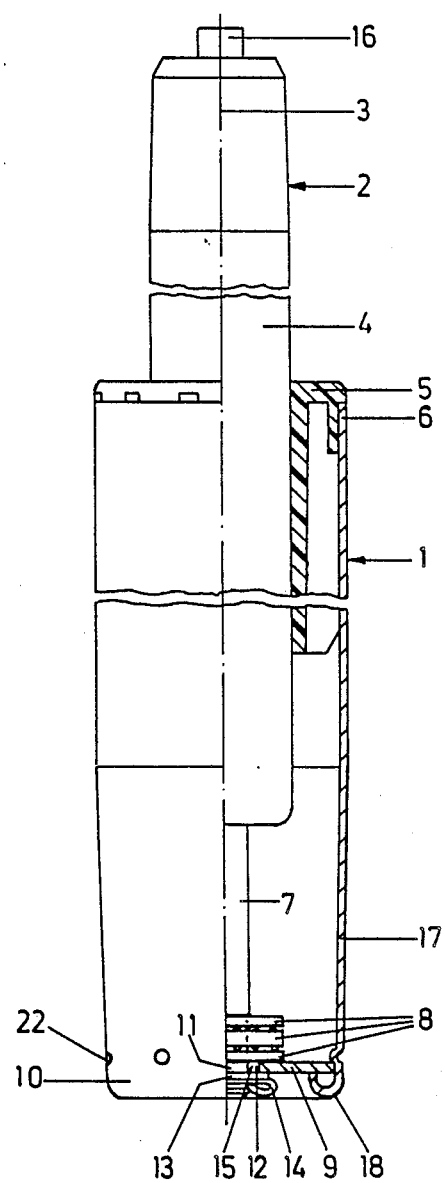
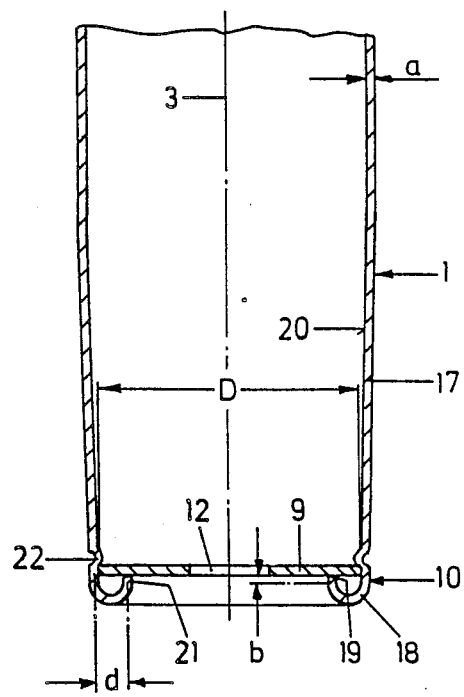

ADJUSTABLE-LENGTH COLUMNS FOR CHAIRS, TABLES OR THE LIKE

BACKGROUND OF THE INVENTION

1. Field of the Invention

The invention relates to an adjustable-length column for chairs, tables or the like, having an upright tube and a pneumatic or hydropneumatic length-adjusting element disposed in it concentrically with a common central longitudinal axis, the housing of the length-adjusting element being radially supported in the upright tube and guided displaceably in the direction of the axis, and the piston rod of the element being secured in the vicinity of its free end to a bottom plate of the upright tube in the direction of the axis, wherein in the vicinity of the end of the upright tube remote from where the housing leaves the upright tube, the bottom plate is supported on a rim of the upright tube protruding radially inward into the upright tube and defined by an end face.

2. The Prior Art

Adjustable-length columns of this kind are known from German Patent No. 19 31 012 (corresponding to U.S. Pat. No. 3,711,054) and European Patent No. 0 133 524 and are widely used. In these known columns, the bottom plate is welded into the upright tube. This kind of manufacturing method is extremely complicated. Attempts have therefore already been made to provide a bead on the lower end of the upright tube, with the bottom plate set onto the bead. At the top, the columns are fastened by means of protrusions that are made by indenting the upright tube. Another previous attempt to avoid time-consuming welding comprised crimping the lower rim of the upright tube inward at approximately a right angle, and placing the bottom plate on that rim (German Utility Model 76 23 283).

SUMMARY OF THE INVENTION

It is the object of the present invention to improve a column of the generic type described above so as to assure that the bottom plate is supported against extremely strong forces in the axial direction of the column, at a low production expenditure.

According to the invention, this object is attained by bending the rim inwardly approximately semicircularly in cross-section, and providing that the bottom is supported on the end face or edge of the rim. An essential feature for the invention is that the lower rim of the column is deformed inward in bead-like fashion, so that the rim forms a groove that is open axially as well as inward into the upright tube. The bottom plate is supported on the end face or edge of the rim, located at a pronounced distance from the inner wall of the upright tube. This end face or edge is located approximately in the radial plane of the upright tube defined by the bottom plate. With the bottom plate supported in this way, extraordinarily strong forces acting in the direction of the central longitudinal axis of the column can be transmitted via the rim to the upright tube.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

Further characteristics, advantages and details of the invention are apparent from the dependent claims and the ensuing description of an exemplary embodiment, referring to the drawing, in which:

FIG. 1 is a longitudinal view of a column, shown partly cut away, according to the invention; and FIG. 2 is a longitudinal section through a fragmentary view of an upright tube of the column.

DETAILED DESCRIPTION OF THE EMBODIMENT

The chair column shown in the drawing has an upright tube 1, in which an adjustable-length gas spring in the form of a pneumatic or hydropneumatic piston/cylinder adjusting element is disposed. The upright tube 1 and the gas spring 2 have a common central longitudinal axis 3.

An external housing 4 of the gas spring 2 is displaceably supported in the direction of the axis 3 in a guide bushing 5, which is disposed on one end 6—in the drawing, the upper end of the upright tube 1. This external housing 4 of the gas spring 2 may either be the housing of the spring itself, or a protected tube surrounding that housing.

Protruding from the housing 4 of the gas spring is a piston rod 7, which is supported in the direction of the axis 3 via an axial roller bearing 8 relative to a bottom plate 9 of the upright tube 1. The bottom plate 9 is located on the end 10 of the upright tube I opposite the first end 6; in the drawing, the end 10 is shown at the bottom. A protrusion 11 of the piston rod 7 that penetrates the axial roller bearing 8 extends through an opening 12, embodied concentrically with the axis 3, of the bottom plate 9. A shim 13 and a spring securing ring 14 secure the protrusion 11 against being pulled out toward the underside of the bottom plate 9. The diameter of the opening 12 is larger than the diameter of the protrusion 11. With this kind of fastening, the gas spring 2 is rotatable relative to the upright tube 1. Because of the radial play 15 between the protrusion 11 and the opening 12, the gas spring is guided in the guide bushing 5 inclinably but without complete tilting relative to the upright tube 1. Finally, with its piston rod 7, it is fixed relative to the upright tube 1 in the direction of the axis 3, so that upon longitudinal adjustment of the gas spring 2 by actuation of an actuating pin 16, the housing 4 of the gas spring 2 is extended out of the upright tube 1 or retracted into it. The actuating pin 16 is located on the end of the housing 4 of the gas spring 2 opposite the piston rod 7. A chair seat or table top is also secured there.

Adjacent the end 10, the upright tube 1 has a cone section 17 tapering slightly conically toward it, by means of which it is possible to fasten the upright tube 1 in a corresponding conical bushing of a multi-legged chair base or the like.

The column as described thus far, used primarily as a chair column but also as a column for tables or the like, is generally known and available on the market; it is for instance described and shown in German Patent No. 19 31 012 (corresponding to U.S. Pat. No. 3,711,054) or European Patent No. 0 133 524.

In accordance with the present invention, the bottom plate 9 in the form of an annular disk is supported on a rim 18, which is rolled inward in cup-like fashion, of the upright tube 1 in the vicinity of its end 10. This inwardly rolled rim has an approximately semicircular shape in cross section; in other words, it has approximately the cross-section of half of a circular ring.

For the ratio of the inside diameter D of the upright tube 1 in this region relative to the mean diameter d of this semicircular rim 18, the following applies: $5 \leq D/d \leq 10$. The bottom plate 9 is supported on the end face or edge 19 of the rim 18 that before the rim 18 is formed forms the end face or edge of the upright tube 1. The bottom plate 9 is accordingly supported on an end face or edge 19 that is spaced apart by a radial distance of approximately d relative to the inside wall 20 of the upright tube 1. As the drawing schematically shows, this makes for relatively close radial spacing between the force induction location, which is between the roller bearing 8 and the bottom plate 9, and the end face or edge 19. The rim 18 bent in approximately a semicircle has an extraordinarily high rigidity or in other words a resistance to deformation in the direction of the axis 3; as a result, even if major force is exerted upon the upper end of the housing 2, adjacent to the actuation pin 16, and this force is transmitted via the roller bearing 8 to the bottom plate 9 and from there into the upright tube 1, deformation of this rim 18 is precluded.

For the mean diameter d, the following applies: $4 \text{ mm} \leq d \leq 6 \text{ mm}$. For the inside diameter D of the upright tube 1 at the location referred to, $40 \text{ mm} \leq D \leq 60 \text{ mm}$. For the wall thickness a of the upright tube 1: $1.5 \text{ mm} \leq a \leq 2.5 \text{ mm}$. The rim 18 may have a small cylindrical part 21 in the end region of the end face or edge 19, extending concentrically to the central longitudinal axis 3. The embodiment of such a part 21 is due to the fact that the region directly adjacent to the end face or edge 19 cannot be bent along a circular arc. Hence production engineering considerations dictate how the part 21 is embodied.

To prevent the bottom plate 9 from being pulled upward out of the upright tube 1, protrusions 22 are embodied directly above the bottom plate 9 in the upright tube 1, protruding from its inner wall 20; they may be produced by indenting the tube from the outside. For example, six such protrusions 22 can be provided, distributed uniformly over the circumference. This provision prevents removal upward of the gas spring 2 and bottom plate 9 from the upright tube 1, for instance if the chair is being raised at its seat portion. These protrusions 22 accordingly need not absorb major forces, but only the weight of the upright tube 1 with a multi-legged pedestal attached to it.

The length b of the cylindrical portion 21 in the direction of the axis 3 is considerably shorter than the mean diameter d of the rim 18: $2 \leq d/b \leq 4$.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An adjustable-length column for chairs, tables or the like, comprising:
    an upright tube;
    a pneumatic or hydropneumatic length-adjusting element disposed in the tube concentrically with a common central longitudinal axis, the length-adjusting element having a piston rod and a housing radially supported in the upright tube and guided displaceably in the direction of the axis;
    a bottom plate to which the piston rod of the element is secured in the vicinity of a free end thereof;
    a rim formed on an under surface of the upright tube and protruding radially inward into the upright tube and defined by an end face of the upright tube remote from where the housing leaves the upright tube, for supporting the bottom plate; and
    wherein the rim is bent inward approximately semicircularly in cross section, and the bottom plate is supported on the end face of the rim.

2. A column as defined by claim 1, wherein for a ratio of an inside diameter (D) of the upright tube in the vicinity of the rim to the mean diameter (d) of the rim, the following applies: $5 \leq D/d \leq 10$.

3. An adjustable-length column for chairs, tables or the like, comprising:
    an upright tube;
    a pneumatic or hydropneumatic length-adjusting element disposed in the tube concentrically with a common central longitudinal axis, the length-adjusting element having a piston rod and a housing radially supported in the upright tube and guided displaceably in the direction of the axis;
    a bottom plate to which the piston rod of the element is secured in the vicinity of a free end thereof;
    a rim formed on an under surface of the upright tube and protruding radially inward into the upright tube and defined by an end face in the vicinity of the end of the upright tube remote from where the housing leaves the upright tube, for supporting the bottom plate;
    wherein the rim is bent inward approximately semicircularly in cross section, and the bottom plate is supported on the end face of the rim; and
    wherein a cylindrical portion of short length (b) in the direction of the axis is embodied between the end face and the rim of approximately semicircular cross section.

4. A column as defined by claim 3, wherein for a ratio of an inside diameter (D) of the upright tube in the vicinity of the rim to a mean diameter (d) of the rim, the following applies: $5 \leq D/d \leq 10$.

5. A column as defined by claim 3, wherein for a ratio of a mean diameter (d) of the rim to the axial length (b) of the cylindrical portion, the following applies: $2 \leq d/b \leq 4$.

6. An adjustable-length column for chairs, tables or the like, comprising:
    an upright tube;
    a pneumatic or hydropneumatic length-adjusting element disposed in the tube concentrically with a common central longitudinal axis, the length-adjusting element having a piston rod and a housing radially supported in the upright tube and guided displaceably in the direction of the axis;
    a bottom plate to which the piston rod of the element is secured in the vicinity of a free end thereof;
    a rim formed on an under surface of the upright tube and protruding radially inward into the upright tube and defined by an end face in the vicinity of the end of the upright tube remote from where the housing leaves the upright tube, for supporting the bottom plate;

wherein the rim is bent inward approximately semicircularly in cross section, and the bottom plate is supported on the end face of the rim; and wherein for a ratio of a mean diameter (d) of the rim to the axial length (b) of the cylindrical portion, the following applies: $2 \leqq d/b \leqq 4$.

7. A column as defined by claim 6, wherein for a ratio of an inside diameter (D) of the upright tube in the vicinity of the rim to the mean diameter (d) of the rim, the following applies: $5 \leqq D/d \leqq 10$.

* * * * *